United States Patent [19]

Järvenkylä et al.

[11] Patent Number: 4,790,975
[45] Date of Patent: Dec. 13, 1988

[54] METHOD AND DEVICE FOR EXTRUSION OF A DOUBLE WALL PLASTICS PIPE

[75] Inventors: Jyri Järvenkylä, Borås; Paul Hölsö, Viskafors, both of Sweden

[73] Assignee: Oy Uponor AB, Nastola, Finland

[21] Appl. No.: 2,404

[22] PCT Filed: Mar. 11, 1986

[86] PCT No.: PCT/SE86/00103

§ 371 Date: Dec. 19, 1986

§ 102(e) Date: Dec. 19, 1986

[87] PCT Pub. No.: WO86/05437

PCT Pub. Date: Sep. 25, 1986

[30] Foreign Application Priority Data

Mar. 12, 1985 [SE] Sweden .................... 8501213

[51] Int. Cl.⁴ .................... B29C 47/04
[52] U.S. Cl. .................... 264/508; 264/514; 264/515; 264/167; 264/173; 264/245; 425/190; 425/192 R; 425/131.1; 425/133.1; 425/326.1; 425/387.1; 425/462; 425/467
[58] Field of Search .......... 264/508, 245, 514–515, 264/173, 511, 209.8, 167; 425/326.1, 131.1, 462, 133.1, 467, 387.1, 396, 192 R, 190

[56] References Cited

U.S. PATENT DOCUMENTS

| 2,808,617 | 10/1957 | Terracini et al. ............ 425/462 |
| 3,266,093 | 8/1966 | Corbett ..................... 425/133.1 |
| 3,268,970 | 8/1966 | Kelly et al. . |
| 3,677,676 | 7/1972 | Hegler ....................... 425/192 R |
| 3,743,456 | 7/1973 | Cini ............................ 425/133.1 |
| 3,994,644 | 11/1976 | Hegler et al. ................ 264/173 |
| 3,994,646 | 11/1976 | Hauck ......................... 425/133.1 |
| 3,996,323 | 12/1976 | Hegler et al. ................ 264/508 |
| 4,296,157 | 10/1981 | Conti ........................... 264/173 |
| 4,312,383 | 1/1982 | Kleykamp ................... 264/508 |
| 4,330,497 | 5/1982 | Agdanowski ............... 264/173 |
| 4,540,537 | 9/1985 | Kamp ......................... 264/177.1 |
| 4,562,023 | 12/1985 | Pabst et al. . |

FOREIGN PATENT DOCUMENTS

| 0096957 | 12/1983 | European Pat. Off. . |
| 1779949 | 10/1972 | Fed. Rep. of Germany . |
| 2247380 | 4/1973 | Fed. Rep. of Germany . |
| 49-28267 | 7/1974 | Japan ......................... 425/131.1 |
| 54-22465 | 2/1979 | Japan ......................... 264/515 |

Primary Examiner—Jeffery Thurlow
Attorney, Agent, or Firm—Merchant, Gould, Smith, Edell, Welter & Schmidt

[57] ABSTRACT

Method in extruding a double-walled plastic tube by using plastic materials of different colors for the inner layer and the outer layer, a portion of the material for the inner layer being diverted to form a longitudinal strip of the outer layer on the outside surface of the tube. The invention also relates to an extrusion tool for working the method, wherein an element (21) is provided inside the tool to divert material from a passage (19) for material for the inner layer to a passage (16) for material for the outer layer.

5 Claims, 2 Drawing Sheets

METHOD AND DEVICE FOR EXTRUSION OF A DOUBLE WALL PLASTICS PIPE

TECHNICAL FIELD

The invention relates to a method in extruding a double-walled plastic tube.

BACKGROUND

In many cases it is desired to indicate on a tube the correct position of installation of the tube. Such indication may be necessary for example in case of infiltration tubes having slots which are asymmetrically distributed; i.e. they are arranged only on that portion of the tube wall, which shall face downwards when the tube is positioned in the ground, i.e. that part of the tube wall, which then shall form the bottom portion of the tube. The indication at present is provided by applying to the tube a longitudinal colour strip which is produced by means of a spray gun or tape or by extrusion from a separate side extruder. In case of plastic tubing having a corrugated or finned outside surface the last-mentioned method is the only one that can be used. However, this method involves high investment cost for a supplementary extruder and moreover causes some operating problems if the tube is a double-walled tube of the type having a corrugated outer wall and a smooth inner wall, because two separate extruders are required for the two walls.

The method of the invention has been developed for such tubes and other plastic tubes having two layers which are extruded from plastic materials of different colours for the inner layer and the outer layer no matter how the two layers are formed, in order to provide in a very simple manner an indication of the correct position of installation by means of a strip on the outer layer, which has a colour deviating from the colour of the remaining portion of the outer layer.

The invention also relates to a tool for working the method.

BRIEF DESCRIPTION OF THE DRAWINGS

In order to explain the invention in more detail embodiments of the method of the invention will be described below, reference being made to the accompanying drawings in which.

DETAILED DESCRIPTION

Figure 1:
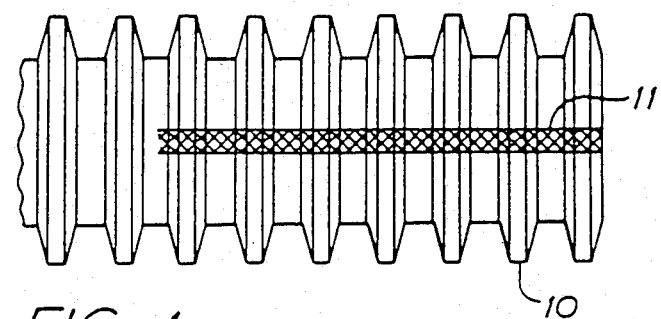
FIG. 1 is a plan view of a tube having a position indication in the form of a longitudinal colour strip.

The tube shown in FIG. 1 having a corrugated outside surface 10 has a longitudinal colour strip 11 for indication of the correct position of installation of the tube. If it is assumed that the tube is of the double-walled type having an outer layer which forms a corrugated outer wall, and an inner layer which forms a smooth inner wall, the outer and inner walls being extruded simultaneously and being interconnected, and if it is also assumed that materials of different colours are used for the outer and inner layers, the indication strip 11 can be produced in a simple manner without large investments by applying the method of the invention.

Figure 2:
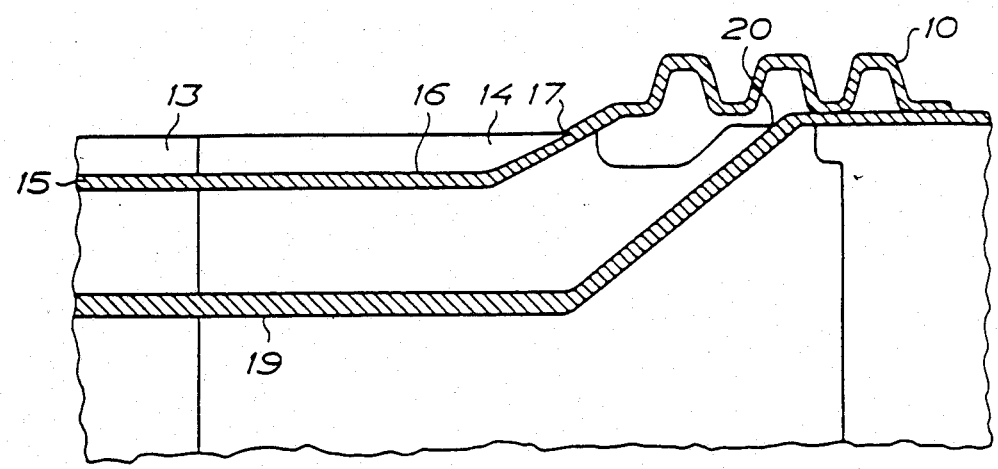
FIG. 2 is a diagrammatic axial sectional view of a tool for extruding a double-walled tube having a corrugated outer wall and a smooth inner wall.

Referring to FIG. 2 a tool 14 is connected to an extruder 13 partly shown. Material 15 for the outer layer of the tube is supplied through a passage 16 and is delivered through a nozzle orifice 17 while material 18 for the inner layer of the tube is supplied through a passage 19 and is delivered through a nozzle orifice 20. The outer layer of material is corrugated which can take place in a known manner by using chains of chilled molds not shown herein, and the corrugated outer layer is connected at the inside crests of the ridges to the smooth inner layer. This is a known and well-tried method.

Figure 3:
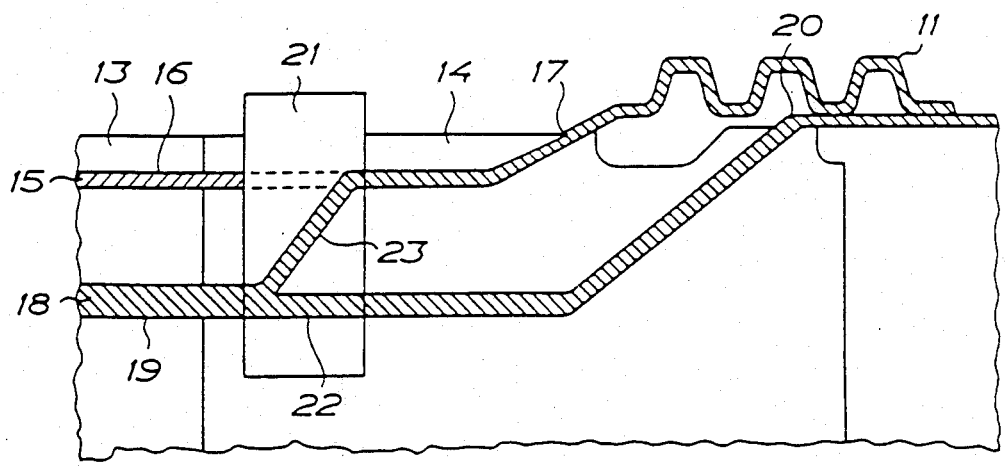
FIG. 3 is a view similar to FIG. 2 but with the tool modified for working a modification of the method of the invention.
Figure 4:
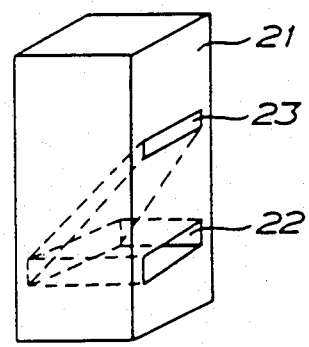
FIG. 4 is a perspective view showing an element intended to be located in the tool when the method of FIG. 3 is applied to divert material to the colour strip.

In FIG. 3 there is shown how the tool of FIG. 2 can be modified for working the method of the invention. An element 21 which is shown in more detail in perspective view in FIG. 4, is detachably mounted in the tool 14 to shut off the flow of material 15 through the passage 16 over a width which equals the width of the desired indication strip of the outer wall. In the element a passage 22 is provided which allows the material 18 to pass through the passage 19 to the nozzle orifice 20, and a branch passage 23 extends from the passage 19 connecting said passage to the nozzle mouth 17. Thus, material 18 will be diverted to form a strip of the outer wall the rest of which is formed by the material 15, and when the two materials 15 and 18 have different colours the desired colour indication on the outside surface of the tube will be obtained.

In FIG. 3 the material 18 replaces completely the material 15 in the indication strip, but it is also conceivable that the supply of the material over the width of the strip is not blocked completely, the supply of this material instead being choked such that the material 18 will be laid in a thin layer over a thin layer of the material 15. In that case the branch passage 23 must be arranged in another way than that shown herein so that the material 18 will be carried upwards and will be laid down on top of the material 15.

Figure 5:
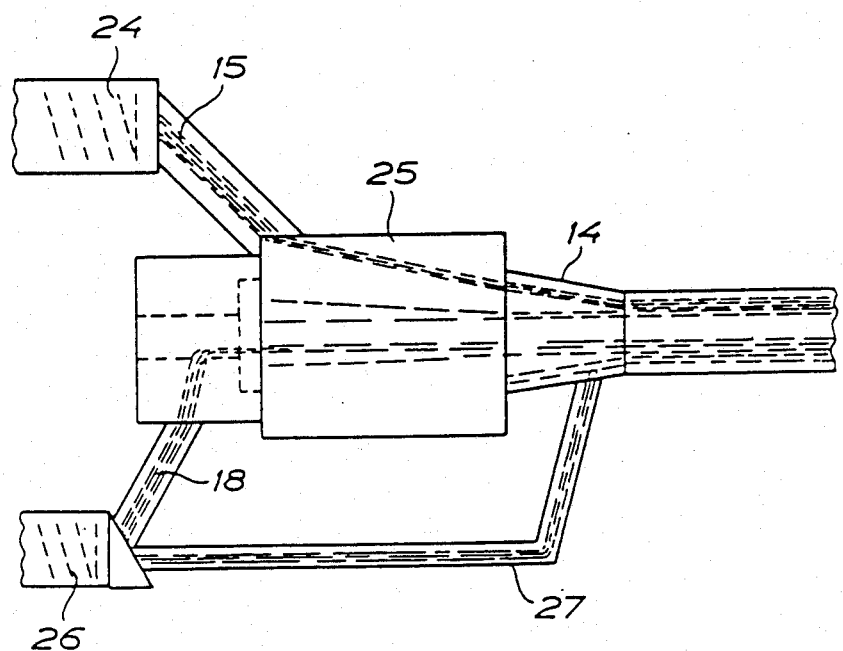
FIG. 5 is a plan view of an extruder arrangement and illustrates another modification of the method of the invention.

In the modification of FIG. 5 to which reference is now made, the material 15 is supplied from an extruder 24 to a tool 25 to form the outer layer, and the material 18 is supplied from an extruder 26 to the tool 25 to form the inner layer. From the tool 25 the two materials are extruded in the manner previously described through the extruder tool 14 for producing the double-walled tube. By the flow of material 15 being blocked or choked over a portion of the circumference of the outer layer, which corresponds to the desired width of the indication strip, and the material 18 being supplied through a shunt conduit 27 from the extruder 26 to the mouth orifice for the material 15 over that portion of the circumference of the outer tube, in which the flow of the material 15 is blocked, or by the pressure in the conduit 27 being allowed to be greater than the pressure in the conduit 15, a strip of the material 18 will be provided on the outside of the tube in the same manner as previously described.

In an extreme case of application of the method according to the invention the strip extends over half the circumference of the tube so that one half of the tube will have one colour and the other half thereof another colour. It is customary to indicate the kind of use of tubes by giving tubes to be positioned in the ground different colours so that if a tube is found during digging in the ground it is possible to see directly the type of tube which has been found. Thus, it is customary to have yellow colour on tubes for electric circuits, and orange colour on tubes for telecommunication circuits. A tube one half of which has one colour and the other half has the other colour can be used for anyone of the two kinds of circuits provided the tube is positioned in such a way in the ground that the correct colour is facing upwards.

We claim:

1. Method in extruding a double-walled plastic tube comprising the steps of:
    extruding an inner wall of plastic material having a first color;
    extruding an outer wall of plastic material having a second color concentrically with the inner wall;
    corrugating the outer wall;
    connecting the outer wall at the inside crests thereof to the outside surface of the inner wall;
    diverting from the plastic material for the inner wall a fraction of such material to the outer wall; and
    supplying the diverted plastic material to the outer wall as a longitudinal strip of said first color on the outside of the outer wall of plastic material of said second color.

2. The method according to claim 1 wherein the material diverted from said material of the first color is positioned on the outside of the material of said second color forming the outer wall, said second material being choked to form a thinner layer under the strip formed by the diverted material.

3. The method according to claim 1 wherein the diverted material from said material of the first color is let into the material of the second color forming the outer wall, by the material for the outer wall being shut off over the region to be occupied by the strip of diverted material.

4. Extrusion tool for extruding a double walled plastic tube comprising:
    a first annular output passage for plastic material for the inner wall of the tube;
    a second annular output passage for plastic material for the outer wall of the tube; and
    means inside the tool forming a passage connecting the first passage with the second passage and extending over a fraction of the respective circumferences of said first and second passages for diverting a strip of material from said first passage to said second passage.

5. The extrusion tool of claim 4 wherein said diverting means is detachably mounted.

* * * * *